2 Sheets—Sheet 1.

J. C. KLEIN.

MANUFACTURE OF PICKS.

No. 6,951. Reissued Feb. 29, 1876.

Attest:
H. L. Perrine.
Jas. L. Coombs

Inventor.
John C. Klein
By James L. Norris
Atty.

N. PETERS, PHOTO-LITHOGRAPHER, WASHINGTON, D. C.

2 Sheets—Sheet 2.

J. C. KLEIN.

MANUFACTURE OF PICKS.

No. 6,951. Reissued Feb. 29, 1876.

Attest:
H. L. Perrine
J. S. Coombs

Inventor:
John C. Klein
By James L. Norris
atty.

N. PETERS, PHOTO-LITHOGRAPHER, WASHINGTON, D. C.

UNITED STATES PATENT OFFICE.

JOHN C. KLEIN, OF PITTSBURG, PENNSYLVANIA.

IMPROVEMENT IN THE MANUFACTURE OF PICKS.

Specification forming part of Letters Patent No. 146,597, dated January 20, 1874; reissue No. 6,951, dated February 29, 1876; application filed February 17, 1876.

*To all whom it may concern:*

Be it known that I, JOHN C. KLEIN, of Pittsburg, in the county of Allegheny and State of Pennsylvania, have invented a new and useful Improvement in the Art of Manufacturing Picks, &c., of which the following is a specification:

In the manufacture of picks and similar implements, it is desirable to form a high eye, in order that the helve may be securely attached thereto. This has been done heretofore by drawing out the metal from the sides of the blank entirely by hammering, or by passing the blank transversely between cam-faced dies; but both these methods have proved defective, as only a limited amount of the metal can be drawn out in this manner, and the extensions or ears thus formed on either side of the eye are simply closed together, or imperfectly welded at their meeting edges. To remedy this defect, and form a high tubular eye in a simple and effectual manner, I take the blank, after the eye has been punched in the usual manner, and set down the metal at either end of the blank to form the shank or prongs of the pick or mattock, thus leaving a solid ridge of iron projecting around the eye. (The dies for setting down the metal aforesaid may be operated by a hammer or by oscillating pressure-rolls.) The blank is then placed upon a mandrel, and passed transversely through peculiarly-shaped concave dies, operated by oscillating rolls, that give to the eye its final shape and finish, as hereinafter described.

In order that my invention may be carried into effect and more perfectly understood, I will describe it more minutely by reference to the accompanying drawings, in which—

Figure 1:
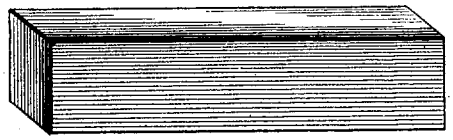
Figure 2:
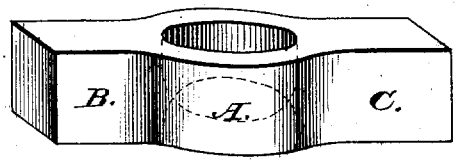
Figure 3:
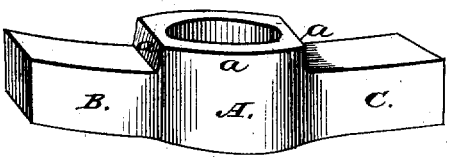
Figure 4:
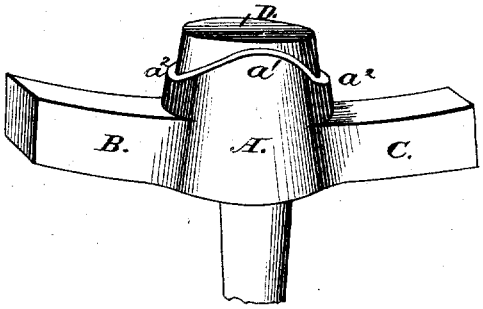
Figure 5:
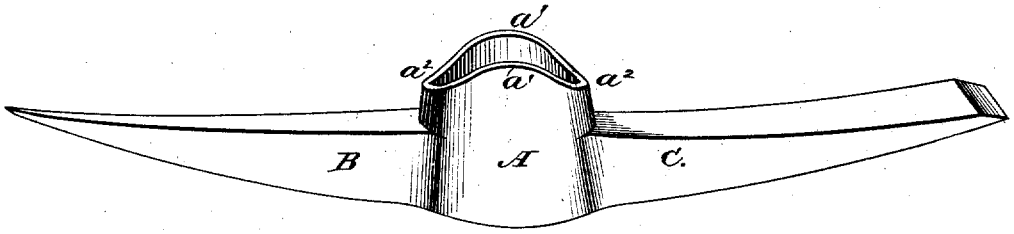
Figure 6:
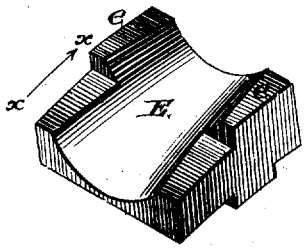
Figure 7:
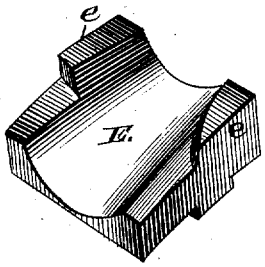
Figure 8:
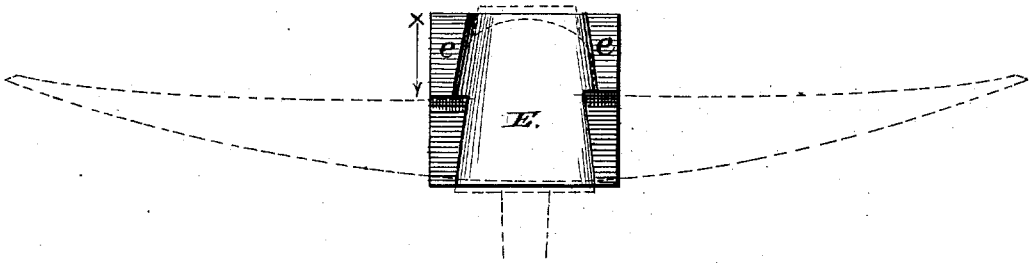
Figure 9:
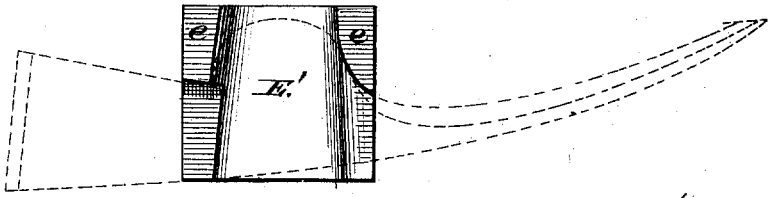

Figure 1 is a perspective view of a rectangular blank of iron of suitable dimensions to form the body of the pick or mattock; Fig. 2, a similar view of the blank after the eye has been punched edgewise through it; Fig. 3, a similar view of the blank after the eye has been struck up; Fig. 4, a similar view of the blank with the mandrel inserted for enlarging and finishing the eye between the dies; Fig. 5, a similar view of finished pick, with its eye formed by my improved method; Fig. 6, a view of one of a pair of dies for finishing the eye of a pick; Fig. 7, a view of one of a pair of dies for finishing the eye of a mattock; Fig. 8, a plan view of the die shown in Fig. 6, with the outline of a pick (dotted) in position; and Fig. 9, a like representation of Fig. 7, with the outline of a mattock (shown by dotted lines) in position.

I first take a rectangular block of iron, as shown in Fig. 1, about two and one-fourth inches by seven-eighths inch by twelve inches in its dimensions, and heat it to the required degree to enable it to be easily worked. The blank is then placed under a press, and the eye punched through it edgewise from both sides, in the usual way, so that the eye will be two and one fourth inches deep in the rough. The blank is then placed, with the same heat, directly between dies that give to it the peculiar shape shown in Fig. 3, the metal being struck upon its edge or passed between rolls, and the eye A thus formed will equal in height the width of the blank. The shank or prongs B C are by this means set down a suitable distance, and this leaves the projecting part *a* of the eye solid around its entire circumference. The blank, when thus formed, is then reheated and the mandrel D driven into the eye to enlarge it, and also serve to manipulate the blank and protect the eye during the finishing operation. When thus prepared the blank is passed transversely between dies E of the peculiar shape that serve to partly draw out and round off the metal on either side of the eye *a'*, and give to the outer surface of the walls of the eye its final finish, as shown in Fig. 4. The dies E are secured to oscillating rolls, one in each, so that they will coincide or match together.

The dies are made convex on their working-surface in the direction of the arrow X, and concave in the direction transversely thereto. An essential feature of the die E consists in the formation of its side walls, which are higher at one end than at the other, so that the upper and lower dies bear upon each other at one end and not at the other. By this means the shank or neck of the pick or mattock may rest upon and between the depressed sides of the dies, and the projection for the eye may be completely encompassed and prevented from spreading laterally by the raised sides *e e* of the walls. The shoulder thus formed in the dies also materially aids the operator in placing the blank between the dies, as it forms an abutment against which the edge of the shank is placed, and also serves to prevent it from slipping or being drawn through the dies in the rolling operation.

It is manifest that if the metal is set down around the eye, as shown at *a* in Fig. 3, before or after punching, or before or after the mandrel has been inserted, the effect will be the same, as the only object in thus setting down the metal is to form a projecting ridge of metal around the eye, to be drawn out and form the tubular extension of the eye.

When the eye has been thus formed the prongs of the blank are reheated separately and drawn out and finished in the usual way. The projecting part of the eye, being perfectly solid at the ends $a^2$ $a^2$, possesses obvious advantages over those that are drawn out in the usual way and simply closed together, it being impracticable to weld them.

As that part of the handle which passes through the eye is wedge-shaped on its upper and lower sides, it affords a very powerful mechanical agent to divide or separate the two sides of the eye, and when this is accomplished even very slightly the handle becomes loose, and the utility of the implement is impaired.

By the peculiar form of the die E, when used in connection with the blank hereinbefore described, I am enabled to form a stronger eye and give to it a more perfect finish than can be obtained by the ordinary method of hammering and swaging; and it furthermore requires less time and skill in performing the work, thus improving the quality and also reducing the cost of the product.

It will be readily seen that the eye of a mattock or similar implement may be formed in the same manner, with but slight change in the shape of the dies.

I claim as my invention—

1. The within-described method of forming the eye of picks, consisting in first punching the bar; second, in setting down the metal on either end around the eye; and, lastly, drawing down on a mandrel between rolling-dies, substantially as described and shown.

2. The dies E, constructed as described, for drawing down the eye, substantially as shown.

In testimony whereof I have hereunto set my hand this 25th day of January, A. D. 1876.

JOHN CHR. KLEIN.

Witnesses:

JOS. L. COOMBS,

A. H. NORRIS.